(12) United States Patent
Baun et al.

(10) Patent No.: US 11,466,659 B2
(45) Date of Patent: Oct. 11, 2022

(54) YAW ARRANGEMENT FOR A MULTIROTOR WIND TURBINE

(71) Applicant: Vestas Wind Systems A/S, Aarhus N. (DK)

(72) Inventors: Torben Ladegaard Baun, Aarhus N (DK); Jesper Lykkegaard Neubauer, Aarhus N. (DK); Leif Christoffersen, Vejle Øst (DK); Per Holten-Møller, Aarhus N. (DK); Anders Yde Wollesen, Aarhus C. (DK)

(73) Assignee: Vestas Wind Systems A/S, Aarhus N (DK)

( * ) Notice: Subject to any disclaimer, the term of this patent is extended or adjusted under 35 U.S.C. 154(b) by 18 days.

(21) Appl. No.: 17/292,812

(22) PCT Filed: Nov. 13, 2019

(86) PCT No.: PCT/DK2019/050349
§ 371 (c)(1),
(2) Date: May 11, 2021

(87) PCT Pub. No.: WO2020/098896
PCT Pub. Date: May 22, 2020

(65) Prior Publication Data
US 2022/0025845 A1 Jan. 27, 2022

(30) Foreign Application Priority Data
Nov. 15, 2018 (DK) .......................... PA 2018 70750

(51) Int. Cl.
*F03D 1/02* (2006.01)
*F03D 7/02* (2006.01)
*F03D 80/70* (2016.01)

(52) U.S. Cl.
CPC ............. *F03D 1/02* (2013.01); *F03D 7/0204* (2013.01); *F03D 80/70* (2016.05); *F05B 2240/50* (2013.01)

(58) Field of Classification Search
CPC ........... F03D 1/02; F03D 80/70; F03D 7/0204
See application file for complete search history.

(56) References Cited

U.S. PATENT DOCUMENTS

| 6,749,399 B2 * | 6/2004 | Heronemus | ............... A61P 3/02 416/41 |
| 2003/0170123 A1 | 9/2003 | Heronemus | |

(Continued)

FOREIGN PATENT DOCUMENTS

| CN | 102305171 A | 1/2012 |
| CN | 102305188 A | 1/2012 |

(Continued)

OTHER PUBLICATIONS

Danish Patent and Trademark Office, Search and Examination Report in PA 2018 70750, dated May 9, 2019.

(Continued)

*Primary Examiner* — Justin D Seabe
(74) *Attorney, Agent, or Firm* — Wood Herron & Evans LLP (57) ABSTRACT

A multirotor wind turbine (1) comprising a yaw arrangement (6) and a tower (2) is disclosed. A load carrying structure comprises first and second arms (3) extending from the yaw arrangement (6) and carrying energy generating units (4). the yaw arrangement (6) comprises an outer wall part (7) arranged coaxially with the tower (2) and forming a closed ring extending circumferentially about an outer surface of the tower (2), thereby forming a space (8) between the tower (Continued)

(2) and the outer wall part (7). The outer wall part (7) and the outer surface of the tower (2) are rotatable relative to each other.

14 Claims, 10 Drawing Sheets

(56) References Cited

U.S. PATENT DOCUMENTS

2009/0220342 A1* 9/2009 Wu .......................... F03D 1/04
                                                                416/124
2019/0072074 A1* 3/2019 Pecher .................... F03D 17/00

FOREIGN PATENT DOCUMENTS

| DE | 102012020052 B3 | | 4/2014 | | |
|----|---|---|---|---|---|
| EP | 3339631 A1 | | 6/2018 | | |
| FR | 1074780 A | | 10/1954 | | |
| FR | 2868483 A1 | * | 10/2005 | ............. | F03D 1/02 |
| WO | 2010098813 A1 | | 9/2010 | | |
| WO | 2017108057 A1 | | 6/2017 | | |

OTHER PUBLICATIONS

European Patent Office, International Search Report and Written Opinion in PCT Application No. PCT/DK2019/050349, dated Feb. 12, 2020.

* cited by examiner

YAW ARRANGEMENT FOR A MULTIROTOR WIND TURBINE

FIELD OF THE INVENTION

The present invention relates to a multirotor wind turbine, i.e. a wind turbine comprising two or more energy generating units. The multirotor wind turbine of the invention comprises a yaw arrangement for rotatably mounting a load carrying structure having one or more energy generating units mounted thereon on the tower. The invention further relates to a yaw arrangement for such a multirotor wind turbine.

BACKGROUND OF THE INVENTION

Wind turbines normally comprise one or more energy generating units, each energy generating unit comprising a hub carrying one or more wind turbine blades. The wind acts on the wind turbine blades, thereby causing the hub to rotate. The rotational movements of the hub are transferred to a generator, either via a gear arrangement or directly, in the case that the wind turbine is of a so-called direct drive type. In the generator, electrical energy is generated, which may be supplied to a power grid.

Some wind turbines are provided with two or more energy generating units in order to increase the total power produced by the wind turbine, without having to provide the wind turbine with one large, and therefore heavy, energy generating unit. Such wind turbines are sometimes referred to as 'multirotor wind turbines'.

In multirotor wind turbines the energy generating units may be carried by a load carrying structure which is, in turn, connected to the tower via a yaw arrangement allowing the entire load carrying structure to rotate relative to the tower. Thereby at least some of the energy generating units are not mounted directly on the tower, and they may be mounted on the load carrying structure at a position which is displaced from a longitudinal axis defined by the tower, e.g. on arms extending from the tower. Thereby the energy generating units may not be readily accessible from an interior part of the tower.

DE 10 2012 020 052 B3 discloses a wind turbine comprising two rotors, each rotor being mounted on an arm. The arms are connected to a tower via a ring bearing with an inner bearing part attached to the tower and an outer ring having the arms attached thereto.

DESCRIPTION OF THE INVENTION

It is an object of embodiments of the invention to provide a multirotor wind turbine with a yaw arrangement, where the tower of the multirotor wind turbine can pass through the yaw arrangement.

According to a first aspect the invention provides a multirotor wind turbine comprising a yaw arrangement, a tower, two or more energy generating units, and a load carrying structure comprising first and second arms extending from the yaw arrangement, the energy generating units being carried by the arms, and the yaw arrangement being carried by the tower, the yaw arrangement comprising:

an outer wall part arranged coaxially with the tower and forming a closed ring extending circumferentially about an outer surface of the tower, thereby forming a space between the tower and the outer wall part, the outer wall part and the outer surface of the tower being rotatable relative to each other.

Thus, the first aspect of the invention provides a multirotor wind turbine, i.e. a wind turbine comprising two or more energy generating units. The multirotor wind turbine comprises a yaw arrangement, a tower, two or more energy generating units and a load carrying structure. The load carrying structure comprises first and second arms extending from the yaw arrangement, and the energy generating units are carried by the arms. The arms may extend from the tower along substantially opposite directions, i.e. from opposing sides of the tower. The arms may extend along directions which are substantially perpendicular to the direction of the tower, or they may extend along a direction forming an acute angle with the direction of the tower. The arms may be connected to the yaw arrangement in such a manner that a line interconnecting the attachment positions of the two arms passes the tower. Alternatively, such an interconnecting line may intersect the tower.

In the present context the term 'energy generating unit' should be interpreted to mean a part of the wind turbine which actually transforms the energy of the wind into electrical energy. Each energy generating unit thereby typically comprises a rotor, carrying a set of wind turbine blades, and a generator. The energy generating unit may further comprise a gear arrangement interconnecting the rotor and the generator. The generator, and possibly the gear arrangement, may be arranged inside a nacelle.

In the present context the term 'tower' should be interpreted to mean a substantially vertical structure, similar to a tower of a traditional single rotor wind turbine.

Since the energy generating units are carried by the arms, which extend from the yaw arrangement, the energy generating units may be positioned at a distance from the tower.

In the present context the term 'yaw arrangement' should be interpreted to mean an arrangement which allows rotational movements of a structure relative to the tower of the wind turbine, in order to direct the rotors of the energy generating units into the incoming wind. In the case of the multirotor wind turbine according to the invention, it is the load carrying structure which rotates relative to the tower.

The yaw arrangement comprises an outer wall part arranged coaxially with the tower and forms a closed ring extending circumferentially about an outer surface of the tower. Thus, the outer wall part surrounds the tower angularly, and the closed ring of the outer wall part has a larger diameter than the diameter of the tower. Thereby a space is formed between the tower and the outer wall part. The space formed in this manner is closed in the sense that it spans the entire circumference of the tower angularly. However, it is preferably possible to access the space, e.g. from an interior part of the tower via a passage in the tower wall. The outer wall part may be a solid wall, or it may have a lattice structure or the like.

The outer wall part and the outer surface of the tower are rotatable relative to each other. Thereby the tower and the outer wall part forms two parts of the yaw arrangement which rotate relative to each other during yawing movements. Furthermore, the walls of the space, i.e. the tower wall and the outer wall, move relative to each other. For instance, in the case that a floor defined in the space is attached to the outer wall, a person entering the space from the interior part of the tower will enter a space where the floor is potentially moving relative to a floor defined in the interior part of the tower. Alternatively, the floor of the space may be connected to the tower, in which case it will not move relative to the floor defined in the interior part of the tower.

The arms of the load carrying structure are preferably attached to the outer wall part, thereby allowing the arms to rotate along with the outer wall part, relative to the tower, during yawing movements. Thereby access between the interior part of the tower and the energy generating units being carried by the arms is independent of the yaw position of the yaw arrangement.

Since the outer wall part is arranged circumferentially with respect to the tower, as described above, the tower may pass through the yaw arrangement. This introduces the possibility of mounting a further load carrying structure on the tower at a higher level, and allowing the two load carrying structures to perform yawing movements independently of each other. This is in particular an advantage in the case that the wind turbine is large, because the wind direction may change along a vertical direction, and therefore it may be inappropriate to direct the rotors of the energy generating units mounted on the two load carrying structures in the same direction.

The arms of the load carrying structure may be hollow, thereby forming an interior space inside the arms. According to this embodiment, the interior space inside a given arm may provide access for personnel and/or equipment to the energy generating unit(s) being carried by the arm, without having to move personnel and/or equipment along an exterior surface of the arm. This improves safety and allows the energy generating unit(s) to be accessed, even if weather conditions are unfavourable.

A passage may be defined between the interior space of each of the arms and the space formed between the tower and the outer wall part. Thereby a given energy generating unit can be reached from the space defined between the tower and the outer wall part, via the passage and the interior space defined inside the arm carrying the energy generating unit.

At least one passage may be defined between an interior part of the tower and the space defined between the tower and the outer wall part, and the space defined between the tower and the outer wall part may form a walking area and/or a transport area. According to this embodiment, it is possible to access the space defined between the tower and the outer wall part via one of the passages. The passage may, e.g., be in the form of an opening provided in the tower wall. Thus, personnel and/or equipment may enter the space, e.g. in order to inspect the yaw arrangement and/or in order to gain access to energy generating units carried by the arms being mounted on the outer wall part.

For instance, in the case that the arms are further hollow and a passage is defined from the space formed between the tower and the outer wall and the interior space of each arm, as described above, an access path is defined between the interior part of the tower and each energy generating unit, via the space and the interior parts of the arms. Thereby it is possible to gain access to a given energy generating unit for personnel and/or equipment from an access opening at the bottom of the tower, regardless of the prevailing weather conditions, and with maximum safety and protection for personnel and equipment.

The yaw arrangement may further comprise:
  a first bearing interconnecting a lower part of the outer wall part and the tower, and
  a second bearing interconnecting an upper part of the outer wall part and the tower.

According to this embodiment, the outer wall part is connected to the tower by means of two bearings, i.e. the first bearing and the second bearing. The bearings connect the lower part and the upper part, respectively, of the outer wall part to the tower. Accordingly, the outer wall part is connected rotatably to the tower at two positions being spaced apart along a vertical direction. This provides a stable connection between the tower and the outer wall part. It is an advantage to connect the outer wall part to the tower via two bearings as described above, because the distance between the bearing is long.

As an alternative, the outer wall part may be connected to the tower via a single bearing, e.g. a torsion bearing.

The space formed between the tower and the outer wall part may further be arranged between the first bearing and the second bearing.

The first bearing may be configured to handle axial loads and radial loads of the yaw arrangement. According to this embodiment, the first bearing, i.e. the lowermost bearing, handles axial loads as well as radial loads of the yaw arrangement. According to this embodiment, the axial loads are handled by the bearing on which the outer wall part rests. Furthermore, this is a natural position to arrange the yaw drives, and thereby the position where the highest axial loads are expected. Accordingly, it is an advantage that the axial loads are handled by this bearing.

Alternatively or additionally, the second bearing may be configured to handle radial loads of the yaw arrangement. According to this embodiment, the second bearing, i.e. the uppermost bearing, handles radial loads, but not necessarily axial loads, of the yaw arrangement. This makes it easier to perform service on the second bearing, since this may be done without taking other issues, such as support of the outer wall part, into consideration.

It should be noted that preferably one of the bearings is configured to handle axial loads as well as radial loads, whereas the other bearing is configured to handle only radial loads. However, it is not ruled out the axial loads are handled by the second bearing, i.e. the uppermost bearing. In this case the outer wall part hangs from the uppermost bearing, and the yaw drives may advantageously be arranged at this bearing.

The first bearing and/or the second bearing may be provided with one or more sliding pads. Thereby the first bearing and/or the second bearing is/are in the form of a slide bearing. Providing the sliding surfaces of such a slide bearing in the form of one or more sliding pads allows the sliding surfaces to be replaced, e.g. in the case of wear of or damage to the surfaces, without having to replace the entire bearing.

The sliding pads may be provided on horizontal and/or vertical surfaces of the bearing.

The outer wall part may have a cylindrical or conical cylindrical shape. The outer wall part preferably has a shape which follows the shape of the tower. Thus, in the case that the tower is cylindrical the outer wall part is preferably also cylindrical, and in the case that the tower is conical the outer wall part is preferably conical cylindrical.

The yaw arrangement may comprise a yaw ring formed on one of the tower or the outer wall part and one or more yaw drives formed on the other of the tower or the outer wall part. The yaw drives may advantageously be provided with toothed gear wheels being configured to engage a toothed rim of the yaw ring. Thereby the yawing movements of the yaw arrangement are provided by operating the yaw drives in order to rotate the toothed gear wheels. Since the toothed gear wheels engage the toothed rim of the yaw ring, this causes the yaw ring to rotate, thereby providing a relative rotational movement between the tower and the outer wall part.

The yaw ring may be formed from two or more ring segments being joined to each other. Yaw rings are often very large, and therefore difficult to handle during transport and installation. By forming the yaw ring from two or more ring segments, the ring segments may be transported to an installation site separately, and the yaw ring may be assembled on site. This makes transportation of the yaw ring easier and more cost effective.

The outer wall part may be formed from two or more wall segments being joined to each other. Similarly to the situation described above with respect to the yaw ring, this also makes it easier and more cost effective to transport the outer wall part to the installation site.

The wall segments of the outer wall part may be arranged annularly and/or axially relative to each other. For instance, the outer wall part may comprise two or more sections arranged axially with respect to each other, i.e. along a direction being parallel to the longitudinal direction of the tower. In this case, a lower section may be casted, whereas one or more upper sections may be similar to traditional tower sections. The lower, casted section may, in this case, be configured to handle various loads of the yaw arrangement, and the arms of the load carrying structure may be attached to this section. Thereby the part of the of the outer wall part which is supposed to handle heavy loads is made in a very strong and durable manner, whereas the remaining parts of the outer wall part are made in a less strong, but more cost effective manner.

Furthermore, each section may be made from two or more annular segments which, when joined to each other, form a closed ring.

The outer wall part may be provided with a reinforcement flange extending from the outer wall part towards the outer surface of the tower along at least part of the circumference of the outer wall part. According to this embodiment, the outer wall part is reinforced along at least part of the circumference. For instance, the reinforcement flange may be provided in a region where the arms are attached to the outer wall part, and where high loads are therefore expected. Alternatively or additionally, the reinforcement flange may extend from the outer wall part in an outwards direction, i.e. in a direction away from the tower.

The multirotor wind turbine may further comprise a further yaw arrangement being carried by the tower and a further load carrying structure comprising third and fourth arms extending from the further yaw arrangement, the arms of the further load carrying structure carrying energy generating units.

According to this embodiment, the multirotor wind turbine is provided with at least two load carrying structures, each carrying a number of energy generating units. Each load carrying structure is connected to the tower via a separate yaw arrangement, i.e. via the yaw arrangement and the further yaw arrangement, respectively. Accordingly, the load carrying structures, and thereby the energy generating units being carried by the respective load carrying structures, can be yawed into the incoming wind independently.

The further yaw arrangement may be identical to the yaw arrangement, in which case the remarks set forth above are equally applicable with respect to the further yaw arrangement. As an alternative, the further yaw arrangement may be different from the yaw arrangement. For instance, the further yaw arrangement may be connected to the tower in manner which is similar to a traditional yaw connection between a tower and a nacelle of a single rotor wind turbine. In this case the further yaw arrangement may advantageously be connected to the tower at a higher level than the yaw arrangement.

According to a second aspect the invention provides a yaw arrangement for a multirotor wind turbine according to the first aspect of the invention, the yaw arrangement comprising:

an outer wall part arranged coaxially with the tower of the wind turbine and forming a closed ring extending about an outer surface of the tower, thereby forming a space between the tower and the outer wall part, the outer wall part and the outer surface of the tower being rotatable relative to each other.

The yaw arrangement according to the second aspect of the invention is for a multirotor wind turbine according to the first aspect of the invention. The remarks set forth above with reference to the first aspect of the invention are therefore equally applicable here.

The yaw arrangement may further comprise:

a first bearing interconnecting a lower part of the outer wall part and the tower, and a second bearing interconnecting an upper part of the outer wall part and the tower.

This has already been described above.

BRIEF DESCRIPTION OF THE DRAWINGS

The invention will now be described in further detail with reference to the accompanying drawings in which.

DETAILED DESCRIPTION OF THE DRAWINGS

Figure 1:
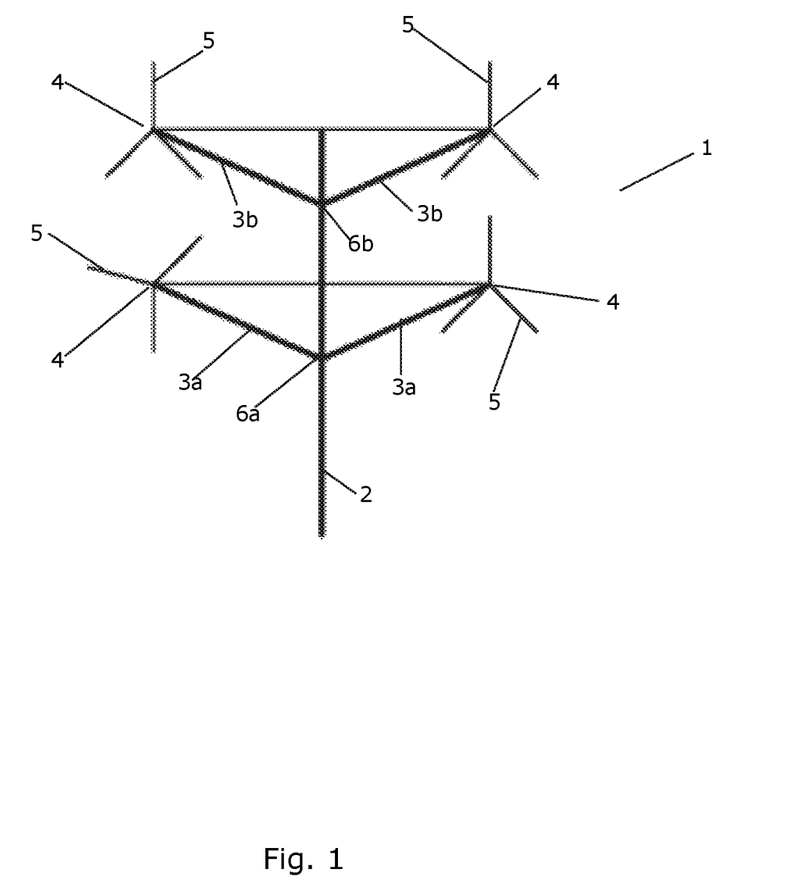
FIG. 1 is a schematic view of a multirotor wind turbine according to an embodiment of the invention.

FIG. 1 is a schematic view of a multirotor wind turbine 1 according to an embodiment of the invention. The wind turbine 1 comprises a tower 2 and two load carrying structures, each comprising two arms 3 extending away from the tower 2 along substantially opposite directions. Each arm 3 carries an energy generating unit 4 with three wind turbine blades 5.

The load carrying structures 3 are connected to the tower 2 via two separate yaw arrangements 6, thereby allowing the lower set of arms 3a to perform yawing movements relative to the tower 2 independently of yawing movements of the upper set of arms 3b relative to the tower.

In traditional single rotor wind turbines, a nacelle carrying the single rotor of the wind turbine is normally connected directly to the top of the tower. Thereby the nacelle and the rotor can readily be accessed via the interior of the tower.

However, in the multirotor wind turbine 1 of FIG. 1 the energy generating units 4 are mounted on the arms 3 at a distance from the tower 2. Thereby the energy generating units 4 are not directly accessible from the interior of the tower 2. Instead, they may be accessed from the outside, e.g.

via hoisting from a position immediately below a relevant energy generating unit 4, or from above via a helicopter. In the multirotor wind turbine 1 according to the invention, the energy generating units 4 can be accessed from the interior of the tower 2 by means of a passage extending through a relevant yaw arrangement 6 and an interior part of a relevant arm 3. This will be described in further detail below.

Figure 2:
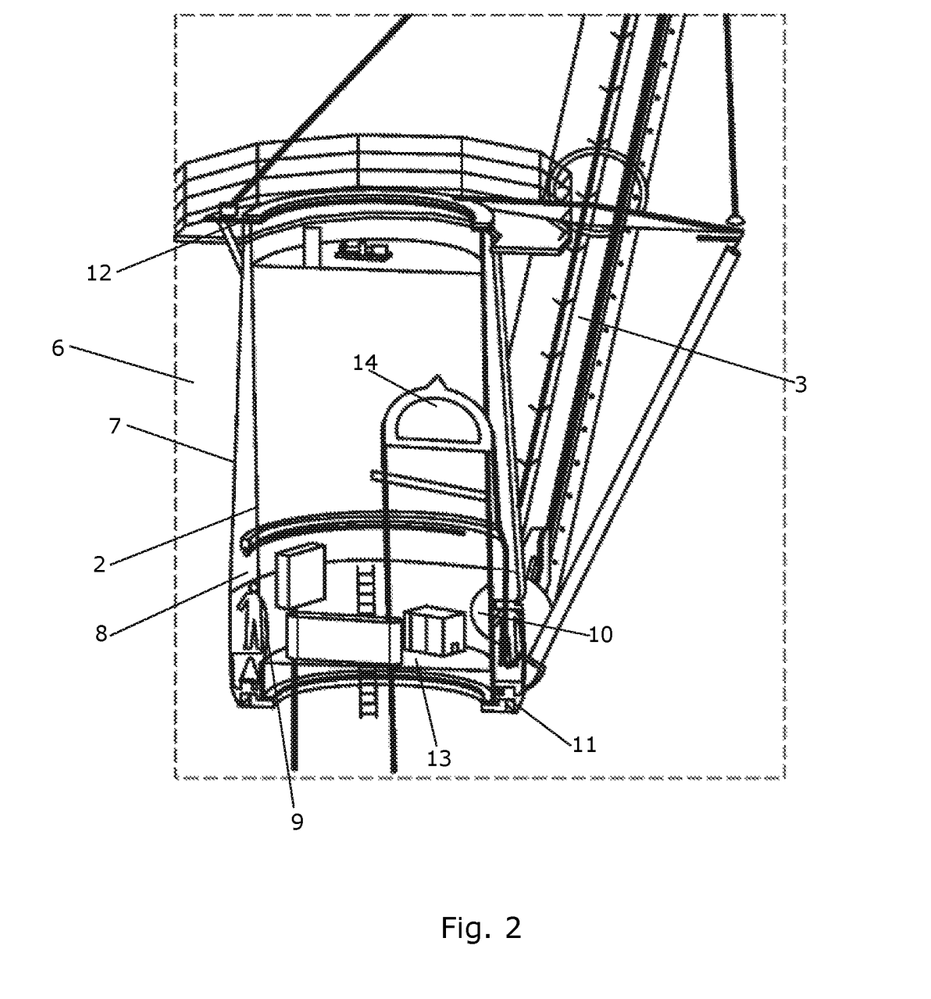
FIGS. 2-5 illustrate a yaw arrangement for a multirotor wind turbine according to an embodiment of the invention.

FIG. 2 is a cross sectional view of a yaw arrangement 6 according to an embodiment of the invention. The yaw arrangement 6 comprises an outer wall part 7 arranged circumferentially about an outer surface of the tower 2. Thereby a space 8 is formed between the tower 2 and the outer wall part 7. The space 8 can be accessed from the interior part of the tower 2 via a passage 9.

Two arms 3, one of which is shown, are attached to the outer wall part 7 and extend in a direction away from the yaw arrangement 6 and the tower 2. The arms 3 are hollow, and the interior of each arm 3 can be accessed from the space 8 formed between the tower 2 and the outer wall part 7 via a passage 10. Thus, an energy generating unit mounted on an arm 3, essentially as illustrated in FIG. 1, can be accessed from the interior of the tower 2 via an access path extending through passage 9, space 8, passage 10 and the interior of the arm 3. This allows access between the interior of the tower 2 and the interior of the arm 3, regardless of the yaw position of the yaw arrangement 6.

The outer wall part 7 is connected to the tower 2 by means of a first bearing 11 and a second bearing 12. Thereby the outer wall part 7 can rotate relative to the tower 2 in order to orientate rotors of the energy generating units mounted on the arms 3 in accordance with the incoming wind. Accordingly, the access path described above extends across parts which are capable of performing rotational movements relative to each other.

The first bearing 11 interconnects a lower part of the outer wall part 7 and the tower 2, and the second bearing 12 interconnects an upper part of the outer wall part 7 and the tower 2. Thereby the extremities of the outer wall part 7 are each supported against the tower 2 by means of a bearing 11, 12, thereby stabilising the structure. The first bearing 11 is configured to handle axial loads as well as radial loads, whereas the second bearing 12 is configured to handle radial loads, but not axial loads. Thereby the axial loads are handled by the bearing 11 on which the outer wall part 7 rests, and the position where the highest axial loads are expected.

A platform 13 is arranged in the interior of the tower 2 at a vertical level corresponding to the position of the yaw arrangement 6. At the platform 13, equipment as well as personnel can be received and intermediately stored. For instance, equipment may be hoisted to the platform 13 from a lower interior part of the tower 2, using a hoisting arrangement 14. Once received at the platform 13, the equipment can be moved into the space 8 defined between the tower 2 and the outer wall 7, via opening 9. From there, the equipment can be moved into the interior of a relevant arm 3, via opening 10, and be moved inside the arm 3 to a relevant energy generating unit. Equipment may also be moved in the opposite direction from an energy generating unit to the lower interior part of the tower 2, via the platform 13.

Figure 3:
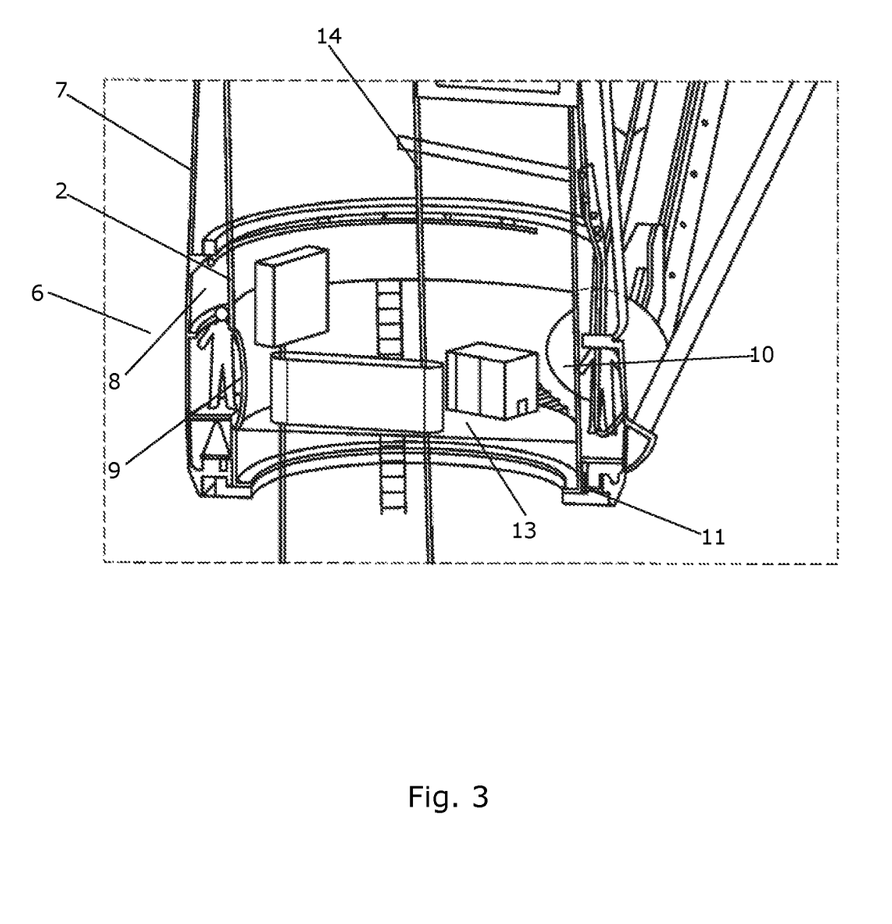

FIG. 3 is a detail of the yaw arrangement 6 of FIG. 2. In FIG. 3 the passage 9 between the interior part of the tower 2 and the space 8 defined between the tower 2 and the outer wall 7 can be seen more clearly than in FIG. 2.

Figure 4:
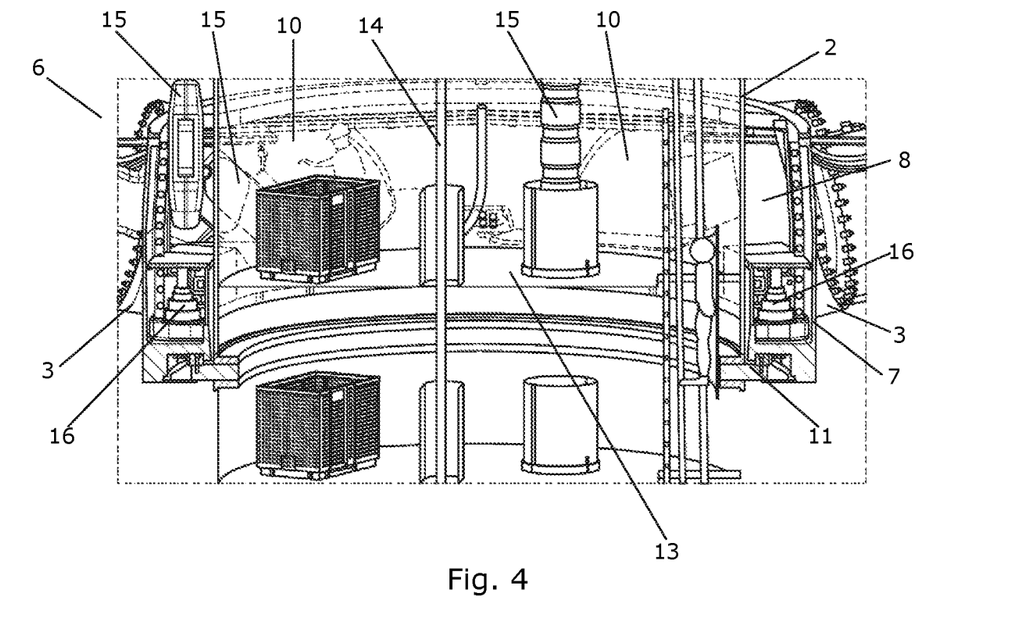

FIG. 4 is a cross sectional view of a part of a yaw arrangement 6 for a multirotor wind turbine according to an embodiment of the invention. Similarly to the embodiment shown in FIGS. 2 and 3, the yaw arrangement 6 comprises an outer wall part 7 arranged circumferentially about the tower 2, thereby forming a space 8 there between.

In the embodiment of FIG. 4 the outer wall part 7 comprises a casted section onto which the arms 3 are attached, and one or more further sections arranged above the casted section and being attached to the casted section. In FIG. 4 only the casted section is shown. Thereby the part of the outer wall part 7 where the arms 3 are attached is stronger than the remaining part of the outer wall part 7. Accordingly, the manufacturing costs of the outer wall part 7 are minimised without compromising the strength of the outer wall part 7.

FIG. 4 further illustrates equipment being transported inside the wind turbine in transport containers 15. The transport containers 15 have a size and a shape which ensures that the transport containers 15 can be moved from a position at the lower interior part of the tower 2 to an energy generating unit mounted on one of the arms 3. Thereby it is ensured that equipment packed in one of the transport containers 15 will actually be able to reach a destination at an energy generating unit, without risking that the equipment gets stuck.

In FIG. 4 it can further be seen that the yaw arrangement 6 is provided with a plurality of yaw drives 16 configured for driving the yawing movements of the outer wall part 7 relative to the tower 2.

Figure 5:
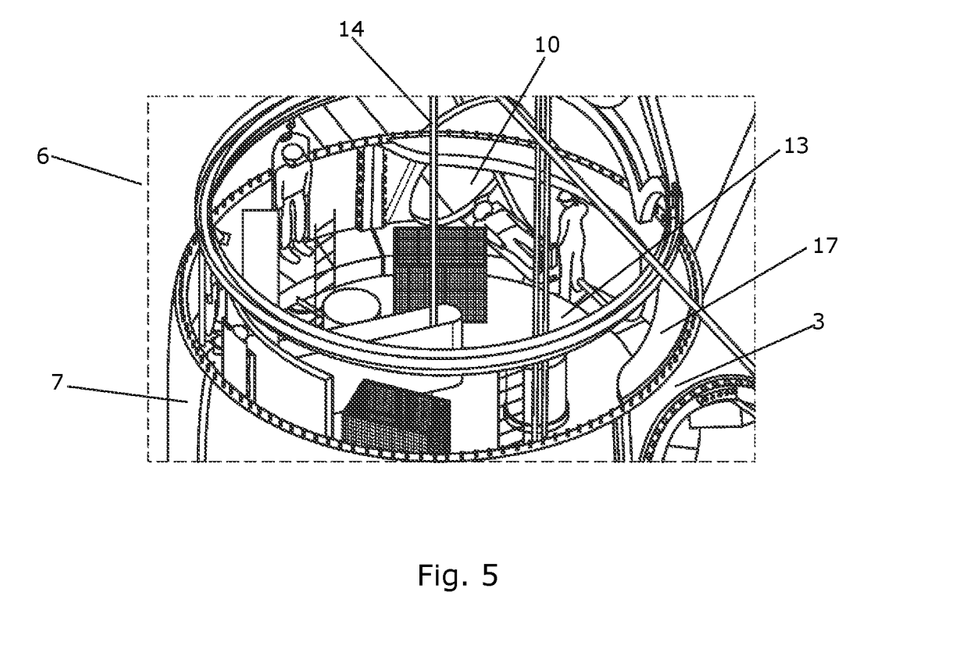

FIG. 5 is a perspective view of the yaw arrangement 6 of FIG. 4. FIG. 5 illustrates that the transport system used for transporting equipment between the lower interior part of the tower 2 and the energy generating unit may also be used for transporting personnel. This could, e.g., be relevant in the case that personnel needs to be evacuated from the wind turbine.

In FIG. 5 it can further be seen that the casted section of the outer wall part 7 is provided with a reinforcement flange 17. The reinforcement flange 17 does not extend the entire circumference of the casted section. Instead, it is positioned in the part of the casted section where the arms 3 are attached, i.e. in the part where the highest loads are expected, and where additional strength is therefore needed. Accordingly, improved strength is obtained with minimal material use.

Figure 6:
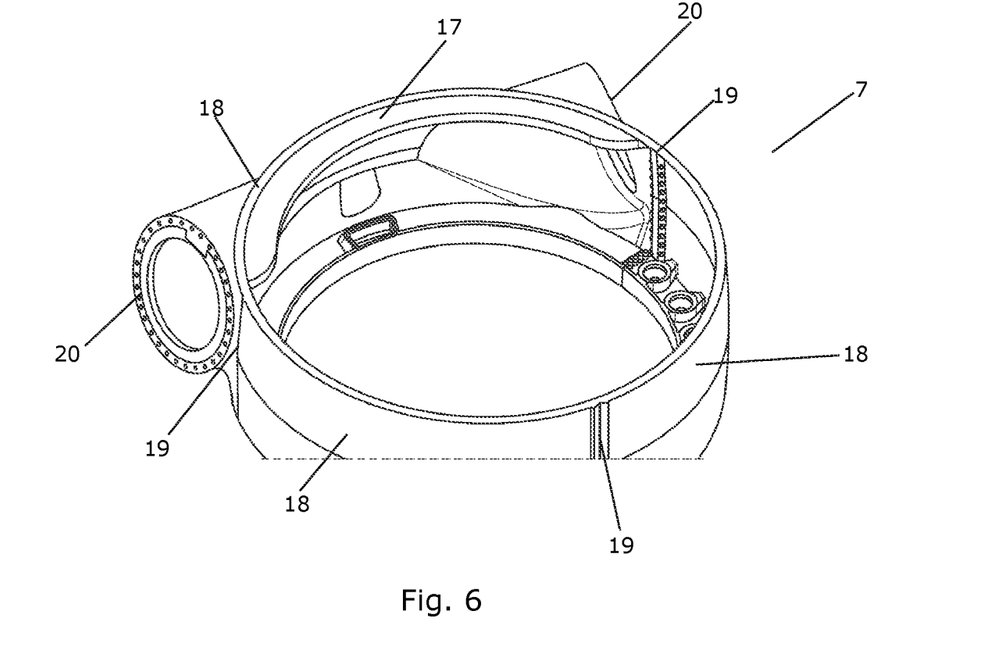
FIG. 6 shows an outer wall part for the yaw arrangement of FIGS. 2-5, FIGS. 7 and 8 illustrate a further yaw arrangement for a multirotor wind turbine according to an embodiment of the invention.

FIG. 6 is a perspective view of a casted section of the outer wall part 7 shown in FIGS. 5 and 6. The casted section is formed by three segments 18, each spanning an angle of approximately 120°, the segments 18 being joined to each other by means of bolt connections 19. One of the segments 18 includes the reinforcement flange 17 and interface portions 20 for attaching the arms to the outer wall part 7.

Figure 7:
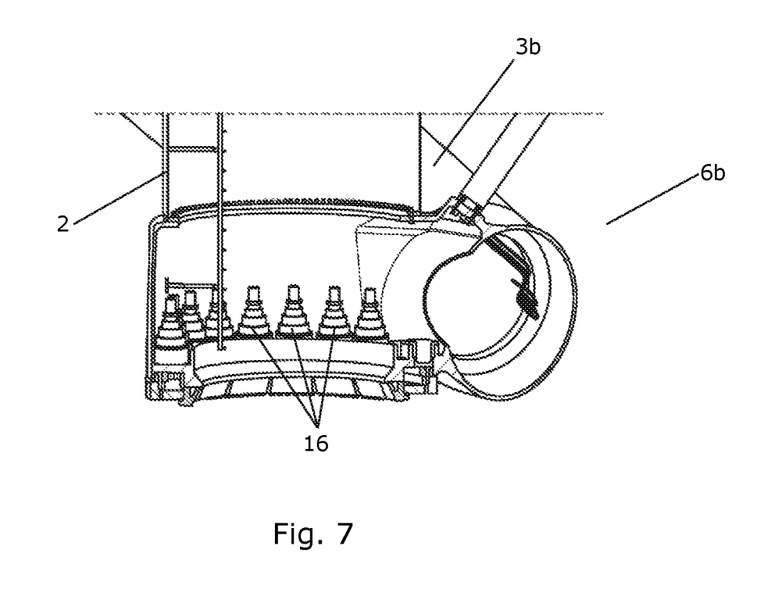

FIG. 7 is a cross sectional view of a further yaw arrangement 6*b* for a multirotor wind turbine according to an embodiment of the invention. The further yaw arrangement 6*b* of FIG. 7 may, e.g., be used for connecting an upper load carrying structure, as illustrated in FIG. 1, to a tower 2. The further yaw arrangement 6*b* is provided with a plurality of yaw drives 16.

Figure 8:
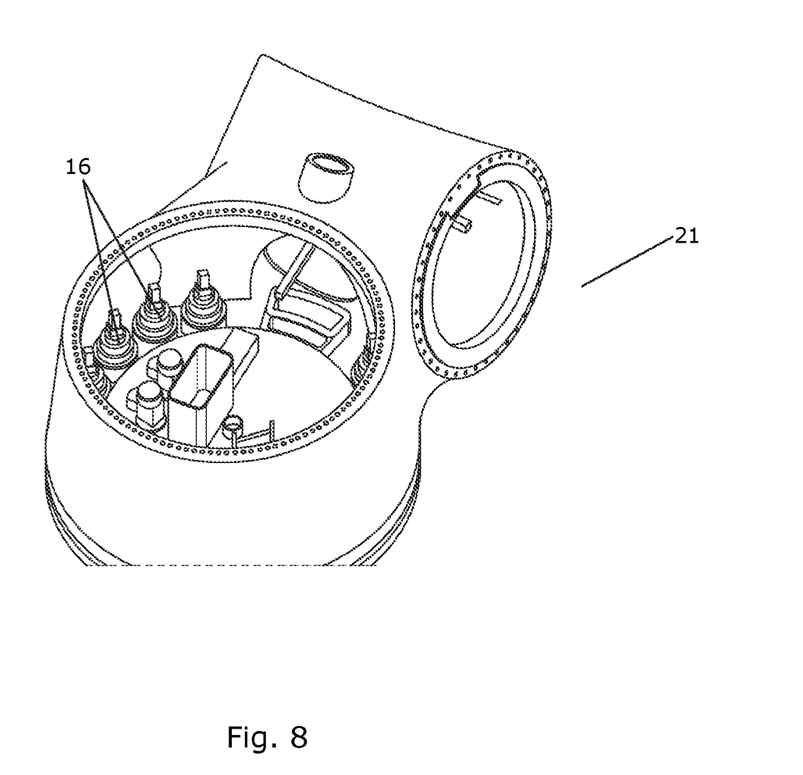

FIG. 8 is a perspective view of the further yaw arrangement 6*b* of FIG. 7.

Figure 9:
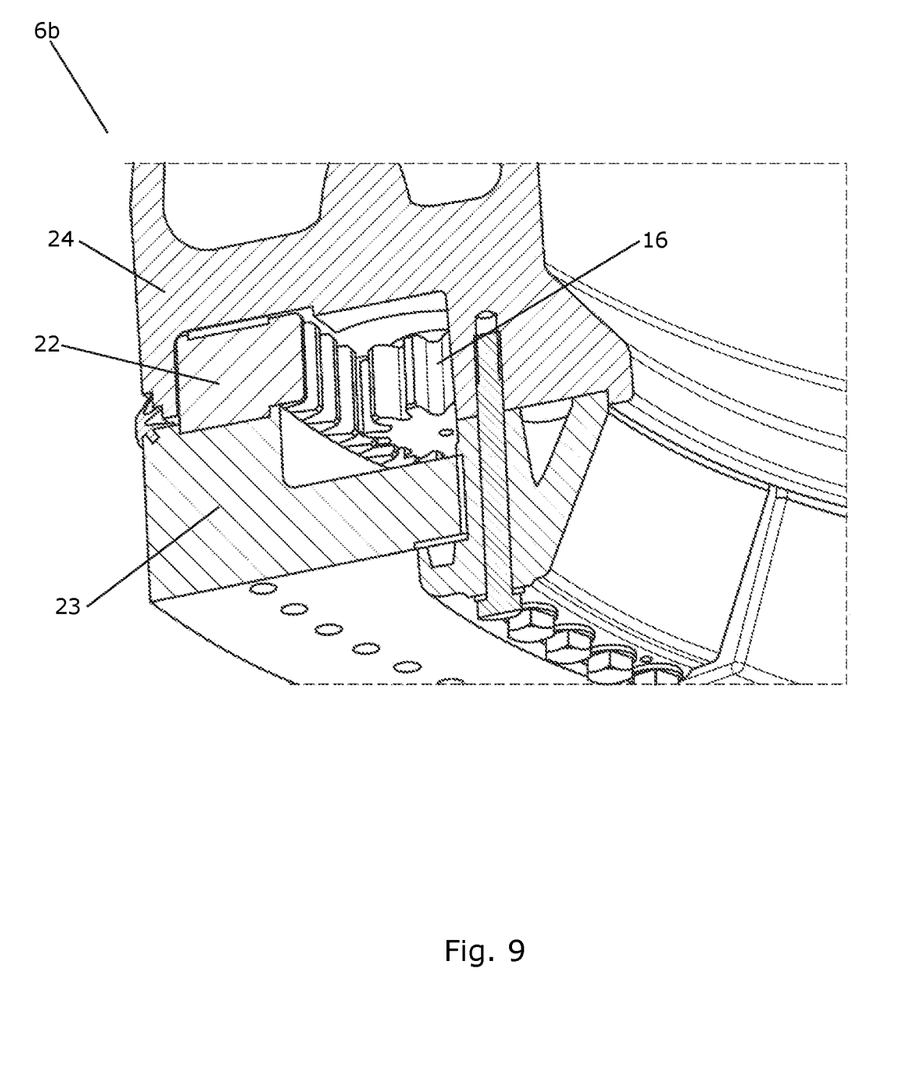
FIG. 9 is a perspective cross sectional view of the further yaw arrangement of FIGS. 7 and 8, and FIGS. 10-15 illustrate various details of a yaw arrangement for a multirotor wind turbine according to an embodiment of the invention.

FIG. 9 is a perspective cross sectional view of a part of the further yaw arrangement 6*b* of FIGS. 7 and 8. The further yaw arrangement 6*b* includes a yaw ring 22 provided with teeth on an inner surface. A plurality of yaw drives 16, one of which is shown, are arranged in meshing engagement with the teeth of the yaw ring 22. The yaw ring 22 is attached to a first part 23 being connected to the tower, and the yaw drives 16 are attached to a second part 24 being connected to a load carrying structure. Thereby, operating the yaw drives 16 causes relative rotational movements between the yaw ring 22 and the yaw drives 16. This causes relative rotational movements between the first part 23 and the second part 24, and thereby between the tower and the load carrying structure.

Figure 10:
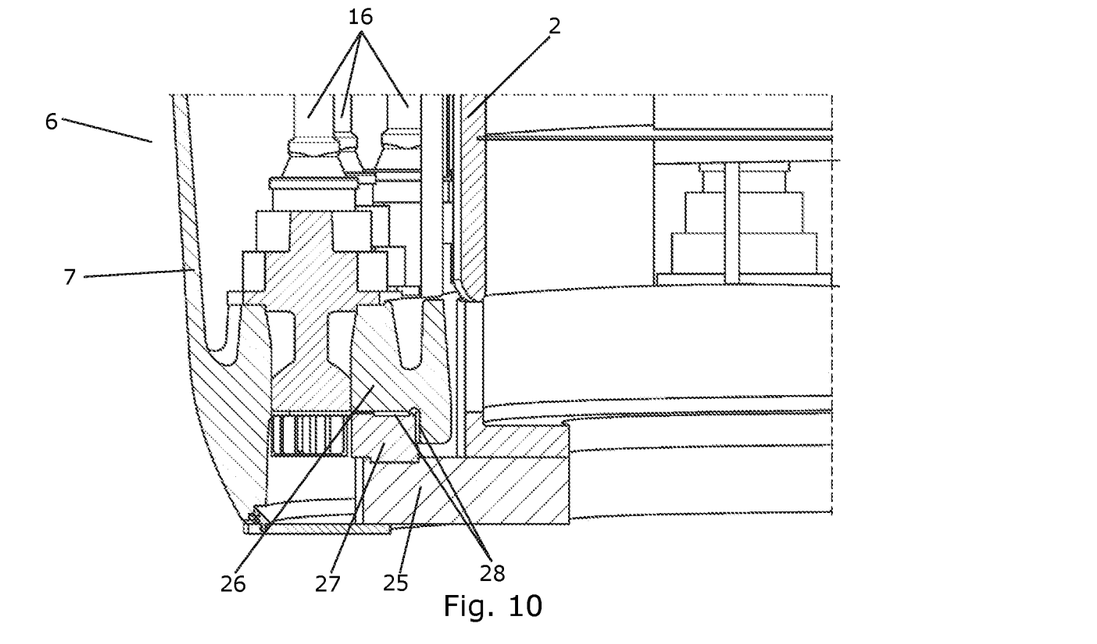

FIG. 10 is a cross sectional view of a part of the yaw arrangement 6 of FIGS. 4-6. FIG. 10 shows the first bearing 11, i.e. the bearing 11 which connects the lower part of the outer wall part 7 to the tower 2. The first bearing 11 comprises a first bearing part 25 being connected to the tower 2 and a second bearing part 26 being connected to the outer wall part 7. A yaw ring 27 is attached to the first bearing part 25, and is provided with a toothed outer rim.

A plurality of yaw drives 16 are attached to the second bearing part 26 and to the outer wall part 7. The yaw drives 16 are arranged in meshing engagement with the toothed outer rim of the yaw ring 27. Thereby relative rotational movements between the tower 2 and the outer wall part 7 can be obtained by operating the yaw drives 16, in a similar manner to the situation described above with reference to FIG. 9.

The yaw ring 27 is provided with a plurality of sliding pads 18 forming a sliding interface towards the second bearing part 26. This will be described in further detail below. Furthermore, the yaw ring 27 is formed from a plurality of yaw ring segments. This will also be described in further detail below.

Figure 11:
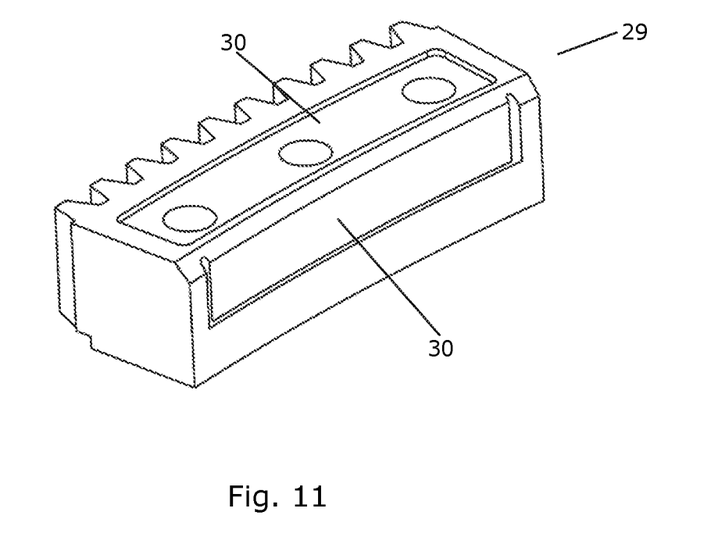

FIG. 11 is a perspective view of a yaw ring segment 29 for the yaw ring 27 shown in FIG. 10. The yaw ring segment 29 comprises recesses 30 configured to receive sliding pads. Providing sliding surfaces in the form of separate sliding pads allows the sliding surfaces to be replaced, e.g. in the case of wear or damage to the sliding surfaces. Furthermore, forming the yaw ring from yaw segments 29 allows a part of the yaw ring to be repaired or replaced without having to replace the entire yaw ring, and without having to dismantle the entire yaw arrangement.

Figure 12:
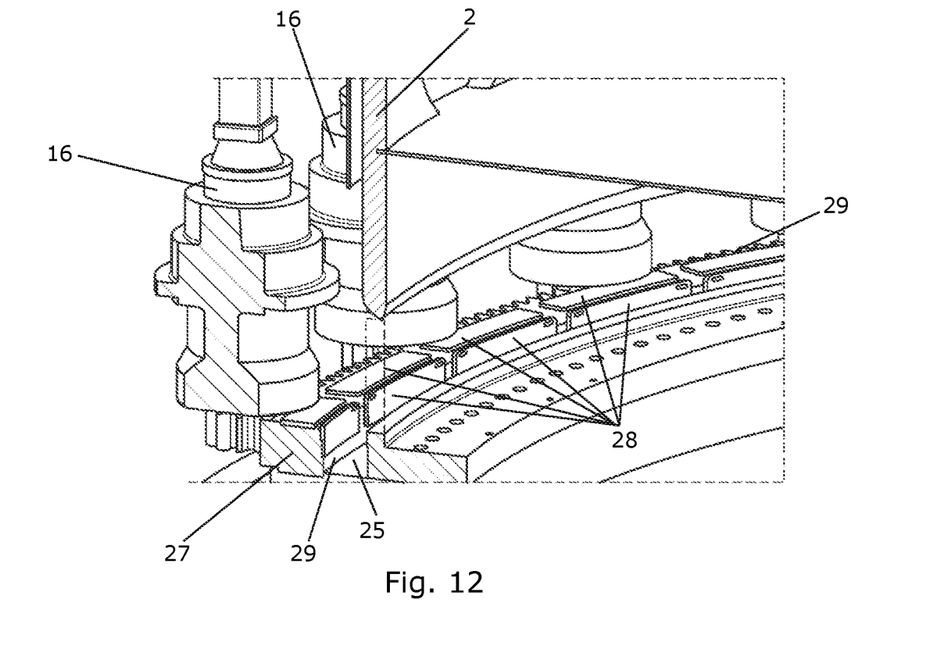

FIG. 12 is a perspective cross sectional view of a part of the yaw arrangement 6 of FIGS. 4-6 and 10. However, the second bearing part and the outer wall part have been omitted for the sake of clarity.

In FIG. 12 it can be seen that the yaw ring 27 is formed from a plurality of yaw ring segments 29 of the kind illustrated in FIG. 11. Each yaw ring segment 29 is provided with two sliding pads 28, one mounted on an upper surface and one mounted on an inner surface of the yaw ring 27. The sliding pads 28 form sliding surfaces towards the second bearing part.

Figure 13:
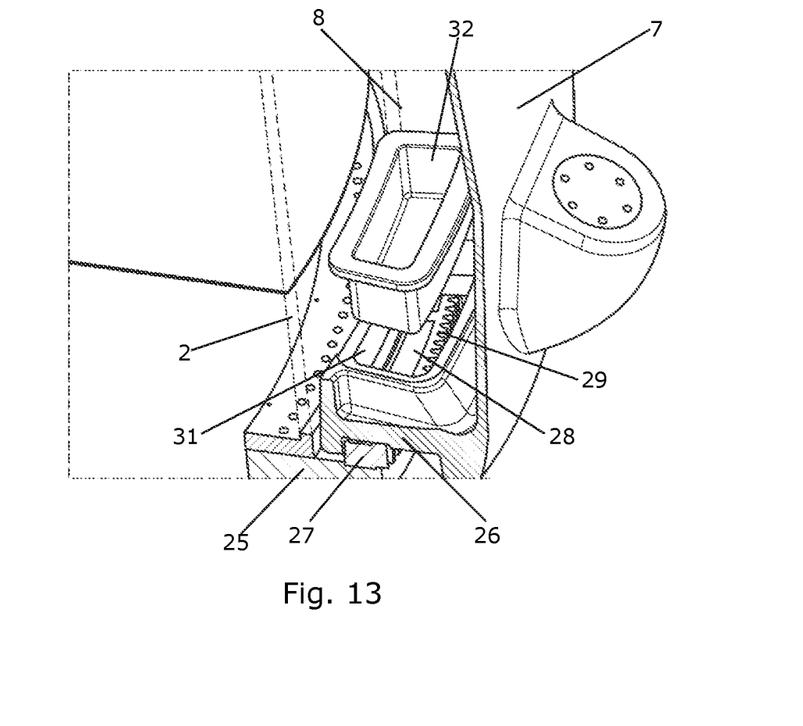

FIG. 13 is a perspective cross sectional view of the yaw arrangement 6 of FIGS. 4-6, 10 and 12. In FIG. 13 it can be seen that the second bearing part 26 is provided with a through-going opening 31 configured to receive a removable cover 32. When the removable cover 32 is arranged in the through-going opening 31, it covers the yaw ring 27. Thereby it is safe for personnel to be present in the space 8 defined between the tower 2 and the outer wall part 7, and the yaw ring 27 is protected. However, when the removable cover 32 is removed from the through-going opening 31, it is possible to gain access to the yaw ring 27, e.g. in order to repair or replace a sliding pad 28 and/or a yaw ring segment 29, or in order to inspect the yaw ring 27.

Figure 14:
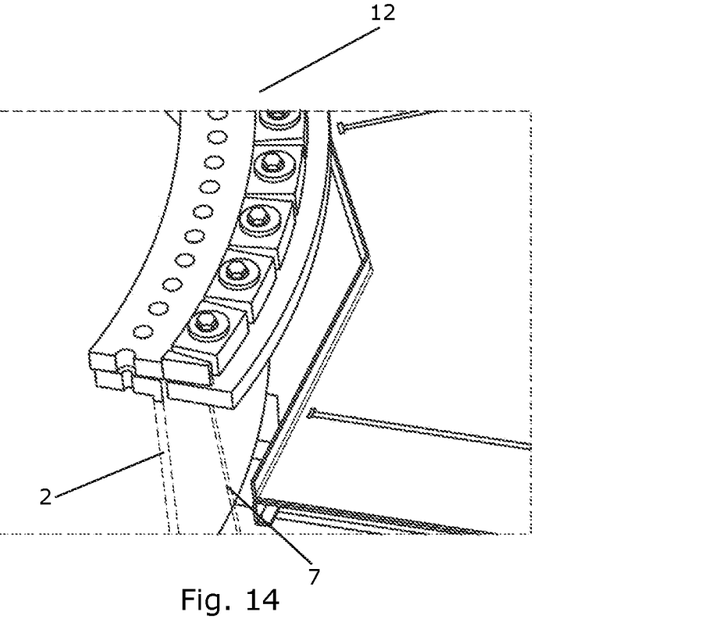

FIG. 14 is a perspective cross sectional view of a second bearing 12 for the yaw arrangement 6 of FIGS. 4-5, 10, 12 and 13. The second bearing 12 is in the form of a sliding bearing.

Figure 15:
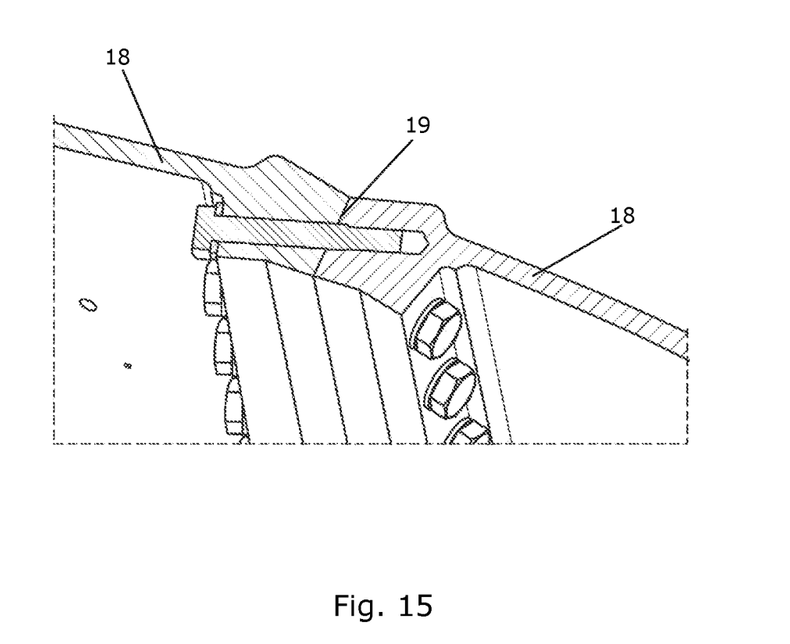

FIG. 15 shows a bolt assembly 19 between two segments 18 of the casted section illustrated in FIG. 6. It can be seen that the bolts of the bolt connection 19 follow a direction which is angled with respect to the outer surfaces of the segments 18.

The invention claimed is:

1. A multirotor wind turbine comprising a yaw arrangement, a tower, two or more energy generating units, and a load carrying structure comprising first and second arms extending from the yaw arrangement, the energy generating units being carried by the arms, and the yaw arrangement being carried by the tower, the yaw arrangement comprising:
an outer wall part arranged coaxially with the tower and forming a closed ring extending circumferentially about an outer surface of the tower, thereby forming a space between the tower and the outer wall part, the outer wall part and the outer surface of the tower being rotatable relative to each other,
wherein the arms of the load carrying structure are hollow, thereby forming an interior space inside the arms, and
wherein a passage is defined between the interior space of each of the arms and the space formed between the tower and the outer wall part.

2. The multirotor wind turbine according to claim 1, wherein at least one passage is defined between an interior part of the tower and the space defined between the tower and the outer wall part, and wherein the space defined between the tower and the outer wall part forms a walking area and/or a transport area.

3. The multirotor wind turbine according to claim 1, wherein the yaw arrangement further comprises:
a first bearing interconnecting a lower part of the outer wall part and the tower, and
a second bearing interconnecting an upper part of the outer wall part and the tower.

4. The multirotor wind turbine according to claim 3, wherein the first bearing is configured to handle axial loads and radial loads of the yaw arrangement.

5. The multirotor wind turbine according to claim 3, wherein the second bearing is configured to handle radial loads of the yaw arrangement.

6. The multirotor wind turbine according to claim 3, wherein the first bearing and/or the second bearing is provided with one or more sliding pads.

7. The multirotor wind turbine according to claim 1, wherein the outer wall part has a cylindrical or conical cylindrical shape.

8. The multirotor wind turbine according to claim 1, wherein the yaw arrangement comprises a yaw ring formed on one of the tower or the outer wall part and one or more yaw drives formed on the other of the tower or the outer wall part.

9. The multirotor wind turbine according to claim 8, wherein the yaw ring is formed from two or more ring segments being joined to each other.

10. The multirotor wind turbine according to claim 1, wherein the outer wall part is formed from two or more wall segments being joined to each other.

11. The multirotor wind turbine according to claim 1, wherein the outer wall part is provided with a reinforcement flange extending from the outer wall part towards the outer surface of the tower along at least part of the circumference of the outer wall part.

12. The multirotor wind turbine according to claim 1, further comprising a further yaw arrangement being carried by the tower and a further load carrying structure comprising third and fourth arms extending from the further yaw arrangement, the arms of the further load carrying structure carrying energy generating units.

13. A yaw arrangement for a multirotor wind turbine, the multirotor wind turbine including a tower, two or more energy generating units, and a load carrying structure having first and second arms extending from the yaw arrangement, the energy generating units being carried by the arms, and the yaw arrangement being carried by the tower, the yaw arrangement comprising:
- an outer wall part arranged coaxially with the tower of the wind turbine and forming a closed ring extending about an outer surface of the tower, thereby forming a space between the tower and the outer wall part, the outer wall part and the outer surface of the tower being rotatable relative to each other,
- wherein the arms of the load carrying structure are hollow, thereby forming an interior space inside the arms, and
- wherein a passage is defined between the interior space of each of the arms and the space formed between the tower and the outer wall part.

14. The yaw arrangement according to claim 13, further comprising:
- a first bearing interconnecting a lower part of the outer wall part and the tower, and
- a second bearing interconnecting an upper part of the outer wall part and the tower.

\* \* \* \* \*